United States Patent
Schechter et al.

(10) Patent No.: US 9,124,431 B2
(45) Date of Patent: Sep. 1, 2015

(54) EVIDENCE-BASED DYNAMIC SCORING TO LIMIT GUESSES IN KNOWLEDGE-BASED AUTHENTICATION

(75) Inventors: Stuart Schechter, Kirkland, WA (US);
Yordan I. Rouskov, Kirkland, WA (US);
Cormac E. Herley, Bellevue, WA (US);
Charles William Kaufman, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 388 days.

(21) Appl. No.: 12/466,257

(22) Filed: May 14, 2009

(65) Prior Publication Data
US 2010/0293608 A1 Nov. 18, 2010

(51) Int. Cl.
*H04L 9/32* (2006.01)
*G06F 17/27* (2006.01)
*G06F 21/31* (2013.01)
*H04L 12/759* (2013.01)

(52) U.S. Cl.
CPC .......... *H04L 9/3226* (2013.01); *G06F 17/2785* (2013.01); *G06F 17/2795* (2013.01); *G06F 21/31* (2013.01); *H04L 9/3218* (2013.01); *H04L 45/028* (2013.01)

(58) Field of Classification Search
CPC ....... G06F 7/04; G06F 15/16; G06F 17/2785; H04L 45/028; H04L 9/3226; H04L 9/3218
USPC .............................................................. 726/5
See application file for complete search history.

(56) References Cited

U.S. PATENT DOCUMENTS

| | | | |
|---|---|---|---|
| 5,035,625 A * | 7/1991 | Munson et al. | 434/332 |
| 5,180,309 A * | 1/1993 | Egnor | 434/323 |
| 5,276,737 A | 1/1994 | Micali | |
| 5,712,913 A | 1/1998 | Chaum | |
| 5,719,560 A * | 2/1998 | Watkins | 340/5.5 |
| 5,719,941 A * | 2/1998 | Swift et al. | 713/155 |
| 5,774,588 A * | 6/1998 | Li | 382/230 |
| 5,793,951 A * | 8/1998 | Stein et al. | 726/5 |

(Continued)

FOREIGN PATENT DOCUMENTS

WO WO2005045550(A2) 5/2005

OTHER PUBLICATIONS

Innerhofer-Oberperffer, "Using Approximate String Matching Techniques to Join Street Names of Residential Addresses", 2004.*

(Continued)

*Primary Examiner* — O. C. Vostal
(74) *Attorney, Agent, or Firm* — Dan Choi; Judy Yee; Micky Minhas (57) ABSTRACT

Techniques to provide evidence-based dynamic scoring to limit guesses in knowledge based authentication are disclosed herein. In some aspects, an authenticator may receive an input from a user in response to a presentation of a personal question that enables user access to a restricted resource. The authenticator may determine that the input is not equivalent to a stored value, and thus is an incorrect input. The authenticator may then determine whether the input is similar to a previous input received from the user. A score may be assigned to the input. When the input is determined to be similar to the previous input, the score may be reduced. Another request for an input may be transmitted by the authenticator when a sum of the score and any previous scores of the session is less than a threshold.

20 Claims, 9 Drawing Sheets

(56) References Cited

U.S. PATENT DOCUMENTS

| | | | |
|---|---|---|---|
| 5,822,544 A | 10/1998 | Chaco et al. | |
| 5,907,618 A | 5/1999 | Gennaro et al. | |
| 5,920,630 A | 7/1999 | Wertheimer et al. | |
| 5,948,054 A * | 9/1999 | Nielsen | 709/200 |
| 6,026,163 A | 2/2000 | Micali | |
| 6,058,188 A | 5/2000 | Chandersekaran et al. | |
| 6,067,444 A * | 5/2000 | Cannon et al. | 340/7.44 |
| 6,073,099 A * | 6/2000 | Sabourin et al. | 704/256.6 |
| 6,128,735 A | 10/2000 | Goldstein et al. | |
| 6,141,423 A | 10/2000 | Fischer | |
| 6,157,920 A | 12/2000 | Jakobsson et al. | |
| 6,160,891 A | 12/2000 | Al-Salqan | |
| 6,216,229 B1 | 4/2001 | Fischer | |
| 6,249,585 B1 | 6/2001 | McGrew et al. | |
| 6,289,353 B1 * | 9/2001 | Hazlehurst et al. | 1/1 |
| 6,291,399 B1 | 9/2001 | Henmi et al. | |
| 6,389,136 B1 | 5/2002 | Young et al. | |
| 6,487,411 B1 * | 11/2002 | Laakso et al. | 455/437 |
| 6,594,684 B1 | 7/2003 | Hodjat et al. | |
| 6,755,661 B2 * | 6/2004 | Sugimoto | 434/322 |
| 6,941,459 B1 | 9/2005 | Hind et al. | |
| 6,954,755 B2 * | 10/2005 | Reisman | 1/1 |
| 7,082,429 B2 * | 7/2006 | Lin et al. | 707/710 |
| 7,106,845 B1 * | 9/2006 | Zhuk et al. | 379/207.11 |
| 7,178,065 B2 | 2/2007 | Dinker et al. | |
| 7,181,017 B1 | 2/2007 | Nagel et al. | |
| 7,263,717 B1 | 8/2007 | Boydstun et al. | |
| 7,330,971 B1 | 2/2008 | Kukreja et al. | |
| 7,634,800 B2 | 12/2009 | Ide et al. | |
| 7,788,708 B2 | 8/2010 | Doane et al. | |
| 7,827,183 B2 * | 11/2010 | Fraser et al. | 707/748 |
| 7,831,836 B2 | 11/2010 | Beck et al. | |
| 7,860,706 B2 * | 12/2010 | Abir | 704/4 |
| 7,954,144 B1 | 5/2011 | Ebrahimi et al. | |
| 8,015,606 B1 | 9/2011 | Jevans et al. | |
| 8,024,280 B2 * | 9/2011 | Jessus et al. | 706/47 |
| 8,042,039 B2 * | 10/2011 | Anderson | 715/246 |
| 8,078,881 B1 | 12/2011 | Liu | |
| 8,346,701 B2 * | 1/2013 | Wang et al. | 706/46 |
| 8,364,952 B2 | 1/2013 | Ho et al. | |
| 8,380,511 B2 * | 2/2013 | Cave et al. | 704/270 |
| 8,397,291 B2 | 3/2013 | Miyazaki et al. | |
| 8,489,388 B2 * | 7/2013 | Bonnet et al. | 704/9 |
| 8,505,075 B2 | 8/2013 | Jevans et al. | |
| 8,566,247 B1 | 10/2013 | Nagel et al. | |
| 2001/0037328 A1 * | 11/2001 | Pustejovsky et al. | 707/3 |
| 2002/0067832 A1 | 6/2002 | Jablon | |
| 2002/0111934 A1 * | 8/2002 | Narayan | 707/1 |
| 2002/0111941 A1 * | 8/2002 | Roux et al. | 707/3 |
| 2002/0123994 A1 * | 9/2002 | Schabes et al. | 707/5 |
| 2003/0004828 A1 | 1/2003 | Epstein | |
| 2003/0050959 A1 * | 3/2003 | Faybishenko et al. | 709/202 |
| 2003/0088544 A1 * | 5/2003 | Kan et al. | 707/3 |
| 2003/0105959 A1 * | 6/2003 | Matyas et al. | 713/168 |
| 2003/0149900 A1 * | 8/2003 | Glassman et al. | 713/202 |
| 2003/0154406 A1 * | 8/2003 | Honarvar et al. | 713/201 |
| 2003/0182584 A1 | 9/2003 | Banes et al. | |
| 2003/0191627 A1 * | 10/2003 | Au | 704/9 |
| 2004/0078775 A1 | 4/2004 | Chow et al. | |
| 2004/0133812 A1 | 7/2004 | Ohmori et al. | |
| 2004/0141508 A1 * | 7/2004 | Schoeneberger et al. | 370/401 |
| 2004/0233040 A1 | 11/2004 | Lane et al. | |
| 2004/0255169 A1 | 12/2004 | Little et al. | |
| 2004/0260694 A1 * | 12/2004 | Chaudhuri et al. | 707/5 |
| 2005/0004905 A1 * | 1/2005 | Dresden | 707/3 |
| 2005/0015376 A1 * | 1/2005 | Fraser et al. | 707/10 |
| 2005/0027583 A1 | 2/2005 | Smit et al. | |
| 2005/0044156 A1 | 2/2005 | Kaminski et al. | |
| 2005/0060643 A1 * | 3/2005 | Glass et al. | 715/501.1 |
| 2005/0096012 A1 | 5/2005 | Borella et al. | |
| 2005/0177750 A1 | 8/2005 | Gasparini et al. | |
| 2005/0192792 A1 * | 9/2005 | Carus et al. | 704/2 |
| 2005/0198537 A1 * | 9/2005 | Rojewski | 713/202 |
| 2005/0235008 A1 | 10/2005 | Camping et al. | |
| 2005/0246534 A1 | 11/2005 | Kirkup et al. | |
| 2005/0251390 A1 * | 11/2005 | Catchpole | 704/242 |
| 2005/0266387 A1 * | 12/2005 | Rossides | 434/323 |
| 2005/0278292 A1 * | 12/2005 | Ohi et al. | 707/1 |
| 2005/0287507 A1 * | 12/2005 | Inandik | 434/323 |
| 2006/0026227 A1 | 2/2006 | Shaughnessy et al. | |
| 2006/0037075 A1 * | 2/2006 | Frattura et al. | 726/22 |
| 2006/0041932 A1 | 2/2006 | Cromer et al. | |
| 2006/0235824 A1 * | 10/2006 | Cheung et al. | 707/1 |
| 2006/0277157 A1 * | 12/2006 | Seidl et al. | 707/2 |
| 2006/0282660 A1 * | 12/2006 | Varghese et al. | 713/155 |
| 2006/0287984 A1 * | 12/2006 | Chen et al. | 707/3 |
| 2006/0294390 A1 * | 12/2006 | Navratil et al. | 713/182 |
| 2007/0050638 A1 | 3/2007 | Rasti | |
| 2007/0061871 A1 * | 3/2007 | Simpkins et al. | 726/4 |
| 2007/0074262 A1 | 3/2007 | Kikkoji et al. | |
| 2007/0078973 A1 * | 4/2007 | Kussmaul et al. | 709/224 |
| 2007/0088952 A1 | 4/2007 | Hewitt et al. | |
| 2007/0106499 A1 * | 5/2007 | Dahlgren et al. | 704/10 |
| 2007/0192248 A1 | 8/2007 | West | |
| 2007/0196804 A1 * | 8/2007 | Yoshimura et al. | 434/323 |
| 2007/0208948 A1 | 9/2007 | Costa-Requena et al. | |
| 2007/0219781 A1 * | 9/2007 | Roche et al. | 704/9 |
| 2007/0233611 A1 | 10/2007 | Boyd et al. | |
| 2007/0234343 A1 | 10/2007 | Gouge et al. | |
| 2007/0276623 A1 | 11/2007 | Kund et al. | |
| 2007/0276653 A1 * | 11/2007 | Greenwald et al. | 704/10 |
| 2007/0294229 A1 * | 12/2007 | Au | 707/3 |
| 2008/0010678 A1 * | 1/2008 | Burdette et al. | 726/15 |
| 2008/0016011 A1 | 1/2008 | Moore | |
| 2008/0065471 A1 * | 3/2008 | Reynolds et al. | 705/10 |
| 2008/0077799 A1 | 3/2008 | Labaton | |
| 2008/0083021 A1 | 4/2008 | Doane et al. | |
| 2008/0127296 A1 * | 5/2008 | Carroll et al. | 726/1 |
| 2008/0133396 A1 | 6/2008 | De La Motte | |
| 2008/0133671 A1 * | 6/2008 | Kalaboukis | 709/206 |
| 2008/0147788 A1 * | 6/2008 | Omoigui | 709/203 |
| 2008/0149518 A1 | 6/2008 | Macor | |
| 2008/0153595 A1 * | 6/2008 | Chickering et al. | 463/42 |
| 2008/0155619 A1 | 6/2008 | Constantinof | |
| 2008/0175377 A1 | 7/2008 | Merrill | |
| 2008/0201132 A1 * | 8/2008 | Brown et al. | 704/9 |
| 2008/0201133 A1 * | 8/2008 | Cave et al. | 704/10 |
| 2008/0216172 A1 * | 9/2008 | Forman et al. | 726/21 |
| 2008/0243811 A1 * | 10/2008 | He et al. | 707/5 |
| 2008/0294637 A1 * | 11/2008 | Liu | 707/6 |
| 2008/0307040 A1 * | 12/2008 | So | 709/203 |
| 2008/0313461 A1 | 12/2008 | Detienne | |
| 2008/0313721 A1 * | 12/2008 | Corella | 726/6 |
| 2009/0012926 A1 * | 1/2009 | Ishikawa et al. | 706/47 |
| 2009/0024385 A1 * | 1/2009 | Hirsch | 704/9 |
| 2009/0064101 A1 | 3/2009 | Boss et al. | |
| 2009/0067756 A1 * | 3/2009 | Meyer et al. | 382/310 |
| 2009/0070311 A1 * | 3/2009 | Feng | 707/5 |
| 2009/0089876 A1 | 4/2009 | Finamore et al. | |
| 2009/0106134 A1 | 4/2009 | Royyuru | |
| 2009/0106846 A1 * | 4/2009 | Dupray et al. | 726/26 |
| 2009/0112828 A1 * | 4/2009 | Rozenblatt | 707/4 |
| 2009/0119371 A1 * | 5/2009 | Chang et al. | 709/206 |
| 2009/0141986 A1 * | 6/2009 | Boncyk et al. | 382/209 |
| 2009/0144724 A1 | 6/2009 | Little | |
| 2009/0150217 A1 * | 6/2009 | Luff | 705/10 |
| 2009/0158030 A1 | 6/2009 | Rasti | |
| 2009/0158406 A1 * | 6/2009 | Jancula et al. | 726/5 |
| 2009/0171925 A1 * | 7/2009 | Elder | 707/4 |
| 2009/0182728 A1 * | 7/2009 | Anderson | 707/5 |
| 2009/0204594 A1 * | 8/2009 | Akkiraju et al. | 707/5 |
| 2009/0220091 A1 | 9/2009 | Howard | |
| 2009/0226872 A1 * | 9/2009 | Gunther | 434/350 |
| 2009/0241183 A1 | 9/2009 | Boss et al. | |
| 2009/0241201 A1 | 9/2009 | Wootton et al. | |
| 2009/0248665 A1 * | 10/2009 | Garg et al. | 707/5 |
| 2009/0271849 A1 | 10/2009 | Kodama et al. | |
| 2009/0292687 A1 * | 11/2009 | Fan et al. | 707/5 |
| 2009/0313696 A1 * | 12/2009 | Himberger et al. | 726/22 |
| 2010/0019026 A1 | 1/2010 | Hochfield et al. | |
| 2010/0049790 A1 | 2/2010 | Schreiber | |
| 2010/0083371 A1 * | 4/2010 | Bennetts et al. | 726/19 |
| 2010/0114989 A1 * | 5/2010 | Cormode et al. | 707/808 |
| 2010/0161596 A1 * | 6/2010 | Yan et al. | 707/723 |

(56) References Cited

U.S. PATENT DOCUMENTS

| | | | |
|---|---|---|---|
| 2010/0161601 A1* | 6/2010 | Gruber | 707/736 |
| 2010/0169244 A1* | 7/2010 | Zeljkovic et al. | 706/12 |
| 2010/0169338 A1* | 7/2010 | Kenedy et al. | 707/758 |
| 2010/0180324 A1* | 7/2010 | Karur | 726/6 |
| 2010/0191686 A1* | 7/2010 | Wang et al. | 706/46 |
| 2010/0229223 A1* | 9/2010 | Shepard et al. | 726/5 |
| 2010/0235311 A1* | 9/2010 | Cao et al. | 706/46 |
| 2010/0262454 A1* | 10/2010 | Sommer et al. | 705/10 |
| 2010/0262463 A1* | 10/2010 | Tryfon | 705/10 |
| 2010/0273139 A1* | 10/2010 | Doppelt et al. | 434/327 |
| 2010/0279267 A1* | 11/2010 | Swanson | 434/362 |
| 2011/0202982 A1 | 8/2011 | Alexander et al. | |
| 2012/0291137 A1* | 11/2012 | Walsh et al. | 726/26 |
| 2014/0324722 A1 | 10/2014 | Schechter et al. | |

OTHER PUBLICATIONS

Cambridge University Press, "Edit Distance", 2008.*

Asgharpour et al., "Adaptive Challenge Questions Algorithm in Password Reset/Recovery".*

Rabkin, "Personal Knowledge questions for fallback authentication: Security questions in the era of Facebook", 2008.*

Tsai et al., "Exploiting Full Parsing Information to Label Semantic Roles Using an Ensemble of ME and SVM via Integer Linear Programming", 2005.*

Bojars et al., "Using the Sementic Web for linking and reusing data across Web 2.0 communities", 2007.*

Risson et al., "Survey of research towards robust peer-to-peer networks: Search methods", 2006.*

Rosenfield, "A maximum entropy approach to adaptive statistical language modelling", 1996.*

Chen et al., "A maximum entropy approach to feature selection in knowledge-based authentication", 2008.*

O'Gorman et al., "Query-directed passwords", 2005.*

Chen et al., "Bayesian Networks for Knowledge-Based Authentication", 2007.*

Merriam-Webster online dictionary, "computer", 2015.*

"Account Password Recovery, Welcome to the Windows LiveID Account Recovery Help Page", retrieved on May 25, 2010 at <<https://support.live.com/eform.aspx?productKey=wlidvalidation&ct=eformcs&scrx=1>>, Microsoft Corporation, 2010, pp. 1.

Brainard, et al., "Fourth-Factor Authentication: Somebody You Know", retrieved on May 24, 2010 at <<http://www.google.co.in/search?hl=en&source=hp&q=Fourth-factor+authentication%3A+somebody+you+know&aq=f&aqi=&aql=&oq=&gs_rfai=>>, ACM, Proceedings of Conference on Computer and Communications Security (CCS), Alexandria, VA, Oct. and Nov. 2006, pp. 168-178.

Brostoff, et al., "Ten Strikes and you're out': Increasing the Number of Login Attempts can Improve Password Usability", retrieved on May 24, 2010 at <<http://www.andrewpatrick.ca/CHI2003/HCISEC/hcisec-workshop-brostoff-2.pdf>>, John Wiley, Proceedings of Workshop on Human-Computer Interaction and Security Systems (CHI), Fort Lauderdale, FLA, Apr. 2003, pp. 1-4.

"Contact Us—Google Accounts Help", retrieved on May 25, 2010 at <<http://www.google.com/support/accounts/bin/request.py?hl=en&contact_type=ara&ctx=account&uses_apps=no&product=other&submit=continue>>, Google, 2010, pp. 1-2.

"Hacker impersonated Palin, Stole E-Mail Password", retrieved on May 24, 2010 at <<http://www.breitbart.com/article.php?id=D939AO101>>, The Associated Press, 2008, pp. 1-2.

Jakobsson, et al., "Love and Authentication", retrieved on May 24, 2010 at <<http://www.ravenwhite.com/files/chi08JSWY.pdf>>, ACM, Proceedings of Conference on Human Factors in Computing Systems (CHI), Florence, IT, Apr. 2008, pp. 197-200.

"NetBank—Demos overview—Commonwealth Bank", retrieved on May 24, 2010 at <<http://www.commbank.com.au/netbank/netcodesms/>>, Commonwealth Bank of Australia, 2010, pp. 1.

Non-Final Office Action for U.S. Appl. No. 12/466,246, mailed on Oct. 11, 2011, Stuart Schechter, "Social Authentication for Account Recovery", 29 pages.

Podd, et al., "Cost-effective Computer Security: Cognitive and Associative Passwords", retrieved on May 24, 2010 at <<http://www.computer.org/plugins/dl/pdf/proceedings/ozchi/1996/7525/00/75250304.pdf? template=1&loginState=1&userData=anonymous-IP%253A%253AAddress%253A%2B203.8.109.15%252C%2B%255B172.16.161.4%252C%2B203.8.109.15%252C%2B127.0.0.1%255D>>, IEEE Proceedings of Australian Conference on Computer-Human Interaction (OZCHI), Nov. 1996, pp. 304-305.

Rabkin, "Personal Knowledge Questions for Fallback Authentication: Security Questions in the era of Facebook", retrieved on May 24, 2010 at <<http://cups.cs.cmu.edu/soups/2008/proceedings/p13Rabkin.pdf>>, ACM, Proceedings of Symposium on Usable Privacy and Security (SOUPS), Pittsburgh, PA, Jul. 2008, pp. 13-23.

Schechter, et al., "It's no secret, Measuring the Security and Reliability of Authentication via 'Secret' Questions", retrieved on May 24, 2010 at <<http://guanotronic.com/~serge/papers/oakland09.pdf>>, IEEE Symposium on Security and Privacy, May 2009, pp. 375-390.

Vu, et al., "Improving Password Security and Memorability to Protect Personal and Organizational Information", retrieved on May 24, 2010 at <<http://homes.cerias.purdue.edu/~bhargav/pdf/VulJHCS07.pdf>>, Elsevier Ltd., International Journal of Human-Computer Studies, vol. 65, Aug. 2007, pp. 744-757.

Zviran, et al., "User Authentication by Cognitive Passwords: an Empirical Assessment", retrieved on May 24, 2010 at <<http://ieeexplore.ieee.org/stamp/stamp.jsp?arnumber=00128279>>, IEEE Proceedings of Conference on Information Technology, Jerusalem, IL, Oct. 1990, pp. 137-144.

Fox, "It's all in the atmosphere", 62 Fordham Law Review, vol. 62, 1993-1994, 7 pages.

Garfinkel, "Email-Based Identification and Authentication: An Alternative to PKI?", IEEE Security and Privacy, Nov. and Dec. 2003, 7 pages.

Heilman, "Liability of the Trustee for the Acts of His Delegate", Dickinson Law Review, Oct. 1947, 13 pages.

Karnin et al., "On Secret Sharing Sytems", IEEE Transaction on Information Theory, vol. IT-29, No. 1, Jan. 1983, 7 pages.

Kent, "Privacy Enhancement for Internet Electronic Mail: Part II: Certificate Based Key Management", retrieved Oct. 14, 2012, at <http://tools.ieti.org/htmal/rfc1422>, RFC 1422, Feb. 2003, 32 pages.

Landru et al., "Protecting a Potential Pensioner's Pension—An Overview of Present and Proposed Law on Trustees' Fiduciary Obligations and Vesting", Brooklyn Law Review, vol. 40, No. 3., Winter 1974, 61 pages.

Office action for U.S. Appl. No. 12/466,246, mailed on Nov. 9, 2012, Schechter et al., "Social Authentication for Account Recovery", 64 pages.

Van Vesor Wolf et al., "Trustee Enviornmental Liability: Avoiding the Quagmire", Enviornmental Claims Journal, vol. 6, Spring 1994, 1 page.

Bellare, et al., "Encapsulated Key Escrow", Technical Report, Massachusetts Institute of Technology, Available at <, http://citeseerx.ist.psu.edu/viewdoc/summary?doi=10.1.1.137.367>>, Nov. 1996, 28 pgs.

Office Action for U.S. Appl. No. 12/466,246, mailed on Mar. 1, 2012, Stuart Schechter, "Social Authentication for Account Recovery", 51 pgs.

Schechter, et al., "Its Not What You Know, But Who You Know—A Social Approach to Last-Resort Authentication", In the Proceedings of the 27th International Conference on Human Factors in Computing Systems, Apr. 2009, pp. 1983-1992.

Office action for U.S. Appl. No. 12/466,246, mailed on Apr. 22, 2013, Schechter et al., "Social Authentication for Account Recovery", 71pages.

* cited by examiner

EVIDENCE-BASED DYNAMIC SCORING TO LIMIT GUESSES IN KNOWLEDGE-BASED AUTHENTICATION

BACKGROUND

People use passwords and other personal authentication inputs frequently when accessing resources such as accounts, computers, and so forth. For example, a person may use a username, a password, and/or a personal identification number (PIN) to gain access to various digital accounts such as a bank account, an email account, and other personal information. Some entities use personal questions to verify an identity of a person requesting accesses to a restricted resource in addition to (or in lieu of) usernames/passwords. For example, a familiar personal question may ask for a maiden name of the requester's mother. In some instances, personal questions are used to recover a forgotten password.

Some people advise use of unique passwords for important accounts. A cautious person may use many unique combinations of usernames/passwords to gain access to an array of resources. This may limit a potential unauthorized access to other resources if the person's username and password for a given resource become known (e.g., a security breach by hackers, etc.) However, this imposes a difficult task for the person to remember and manage their passwords, secret answers, and so forth.

In addition, many resources impose unique personal questions which require the person to enter (and remember) personal question responses. Unfortunately, some personal questions may be ambiguous and/or and not direct the person to enter the exact personal question response upon presentation of the personal question.

Often, a guess limit is imposed by a resource when the person repeatedly enters an incorrect password or personal question response. For example, after five incorrect attempts, a resource may direct the person to an alternative method to gain access to the restricted resource, lock the resource for a predetermined amount of time, or take other action to limit improper or unauthorized access to the resource. In some instances, a person may reach a guess limit despite knowing the requested information, such as when the person repeatedly makes data entry mistakes or for other reasons, which may inconvenience the person, waste time, and impose an expense to pursue other resource access alternatives (e.g., calling a help desk).

Entities that control or design resources attempt to make it difficult for unauthorized users to gain access to their resources. The entities may take approaches to making it difficult to guess a person's username, password, PIN, or personal question response. For example, entities may use multiple personal questions when verifying the identity of a person. In this way, it would be difficult for an unauthorized person to correctly guess the correct response to multiple personal questions. However, entities must balance employing time-consuming and extensive security processes with allowing authorized people to have access to the resources.

SUMMARY

Techniques to provide evidence-based dynamic scoring to limit guesses in knowledge based authentication are disclosed herein. In some aspects, an authenticator may receive an input from a user in response to a presentation of a personal question that enables a user to access a restricted resource. The authenticator may determine that the input is not equivalent to a stored value, and thus is an incorrect input. The authenticator may then determine whether the input is similar to a previous input received from the user. A score may be assigned to the input. When the input is determined to be similar to the previous input, the score may be reduced. Another request for an input may be transmitted by the authenticator when a sum of the score and any previous scores of the session is less than a threshold.

In another aspect, the authenticator may receive a new answer to a personal question. The authenticator may analyze a collection of received answers to the personal question to create a distribution of the received answers. Next, the authenticator may compare the new answer to the distribution of received answers. Finally, the authenticator may designate the new answer as a popular answer when an occurrence of the new answer in the distribution of received answers exceeds a popularity threshold. In some aspects, the authenticator may reject popular answers and request that a user enter a more specific answer. In further aspects, the authenticator may discontinue use of the personal question that generates the popular answer.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

As discussed above, people typically have to input responses (answers) to authentication requests to gain access to a restricted resource. One way to make authentication requests more secure against unauthorized use, and yet more reliable in granting access to an authorized person, is to dynamically adjust scoring of wrong responses based on the type of response that is entered by the person. Thus, certain responses may be penalized more harshly when received in response to an authorization request, and thus reach a threshold faster, than other answers.

In some embodiments, answers may be assigned a score based on the popularity of the answer. The score may be summed after each answer and be periodically compared to the threshold, which may eventually trigger additional security to protect unauthorized access of the requested resource.

When the response is similar (e.g., lexicon or semantic variation, etc.) to an input (the correct answer, a previous response, etc.), then the response may receive a reduced score, which in effect would increase the margin between a summed score and the threshold as compared to a receipt of a response that is not similar to an entry.

In addition, answers to personal questions may be analyzed to determine whether an answer population or distribution indicates that the answer would be relatively easy to guess, and thus less secure than alternative answers. Similarly, answer distribution may be analyzed to selectively remove questions that do not result in selection of difficult-to-guess answers (i.e., favorite baseball team, favorite color, etc.).

The processes and systems described herein may be implemented in a number of ways. Example implementations are provided below with reference to the following figures.

Illustrative Environment

Figure 1:
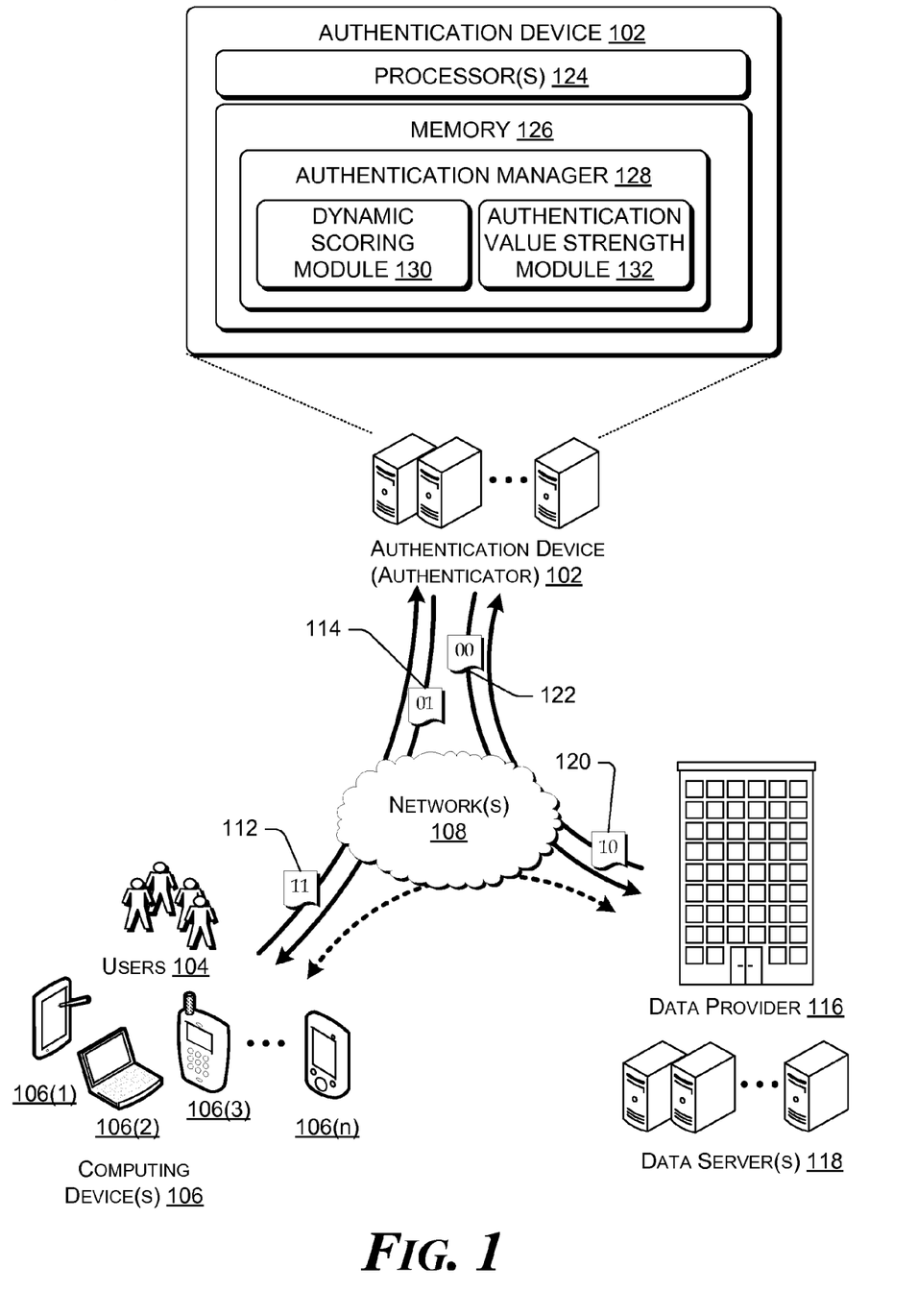
FIG. 1 is a schematic diagram of an illustrative environment that includes authentication servers that receive communications from various entities that seek knowledge based access to restricted resources.

FIG. 1 is a schematic diagram of an illustrative environment 100 that includes authentication servers that receive communications from various entities that seek knowledge based access to restricted resources. The environment 100 includes an authentication device 102 (or simply "authenticator"). The authenticator 102 may enable users 104 to obtain access to a restricted resource by inputting personal authentication information, such as a username, password, personal identification number (PIN), personal question response, and so forth.

The authenticator 102 may be any computing device capable of receiving an input from the users 104, verifying the input against one or more stored instances of user information (text, hashes, etc.), and permitting the user access to a resource, either on the authentication device 102 or separate from the authentication device (e.g., residing a second computing device, etc.). For example, the authenticator 102 may be configured as one or more servers that are accessible via a network (e.g., the Internet). The authenticator 102 may also reside on a personal computer, such as a login prompt to gain access to an application, operating system (OS), or the like. Other examples of implementations of the authenticator 102 may include an electronic safe, a handheld computing device (mobile phone, voicemail server, video game console, music player, etc.), and so forth.

In some embodiments, the users 104 may communicate with the authenticator 102 via computing devices 106 (or simply "clients"). A non-exhaustive list of possible clients 106 may include a personal digital assistant 106(1), a personal computer 106(2), a mobile telephone 106(3), and a music player 106(n). For example, the user 104 may communicate with the authenticator 102 over the network 108 via the clients 106 such as by accessing a password protected website, a voicemail server, a download server, etc. In various embodiments, the users 104 may access the authenticator 102 directly without the use of one of the clients 106.

In embodiments where the authenticator 102 is accessed by one of the clients 106, information may be passed between the clients 106 and the authenticator 102. A user input 112 (response, answer, etc.) may be transmitted by the users 104 and received by the authenticator 102, such as in response to a personal authentication question presented to the user 104 by the authenticator 102. The authenticator 102 may then transmit a message 114 to the user 104 indicating a status of the input 112 as correct or incorrect, or the authenticator 102 may simply provide user access to the restricted resource. When the input 112 is an incorrect input in response to a request for personal authentication information, additional exchanges of data may occur between the users 104 and the authenticator 102 (via the clients 106 or by direct input). In particular, the authenticator 102 may provide the users 104 with additional attempts to provide the input 112 that is correct (i.e., matches a stored answer) by implementing evidence-based dynamic scoring to limit guesses in knowledge based authentication that does not terminate after receipt of a predetermined (static) number of incorrect instances of the inputs 112. When the authenticator is local (e.g., a personal computer, mobile phone, etc.), the user 104 may enter the input 112 directly into the authenticator (e.g., type, speak, etc.).

In various embodiments, the authenticator 102 may exchange communications with the users 104 to establish the correct input that is difficult to guess (strong), which is then stored by the authenticator 102 and used in comparisons with the input 112. The authenticator 102 may reject an input that is not strong, such that the input 112 exceeds a popularity threshold that may indicate the input 112 is relatively easy to guess or otherwise determine (e.g., systematic approach, etc.). Thus, the authenticator 102 may reject an attempt by the users 104 to establish an input 112 because the input 112 is too popular or for other reasons.

In some embodiments, the environment 100 may include a data provider 116, which may communicate with the authenticator 102 via data server(s) 118. In some embodiments, the data provider 116 may provide personal authentication questions during an authentication process with the users 104.

The data provider 116 may transmit data 120, such as personal question(s) and/or answers to the personal question(s), to the authenticator 102 for a security strength analysis. In response, the authenticator 102 may transmit an analysis 122 of the data 120. The analysis 122 may include a recommendation to discontinue use of a personal authentication question that results in answers having a relatively low distribution of all received answers, a population of many popular answers, or other aspects that make the answers relatively easy to guess or ascertain by unauthorized users.

As illustrated, the authenticator 102 may be equipped with one or more processors 124 and memory 126. The memory 126 may include applications, modules, and/or data. In some embodiments, the memory 126 may include an authentication manager 128, which may facilitate providing evidence-based dynamic scoring for personal knowledge based authentication. In some embodiments, the authentication manager 128 may also analyze personal knowledge based questions and/or answers to determine a relative strength of questions/answers such that they will provide relatively secure access to a resource.

The authentication manager 128 may include a number of modules such as a dynamic scoring module 130 and an authentication value strength module 132 (or simply "strength module"). In some embodiments, the dynamic scoring module 130 may dynamically adjust a number of times the users 104 may submit the input 112 to a personal authentication question before additional security measures are enacted by the authenticator 102. In various embodiments, the authentication value strength module 132 may assess and report the relative strength of a personal authentication question and/or answer. For example, the authentication value strength module 132 may reject a user selection of an answer as too popular and then prompt the authenticator 102 to request another answer from the user 104.

Illustrative Evidence-Based Dynamic Scoring

Figure 2:
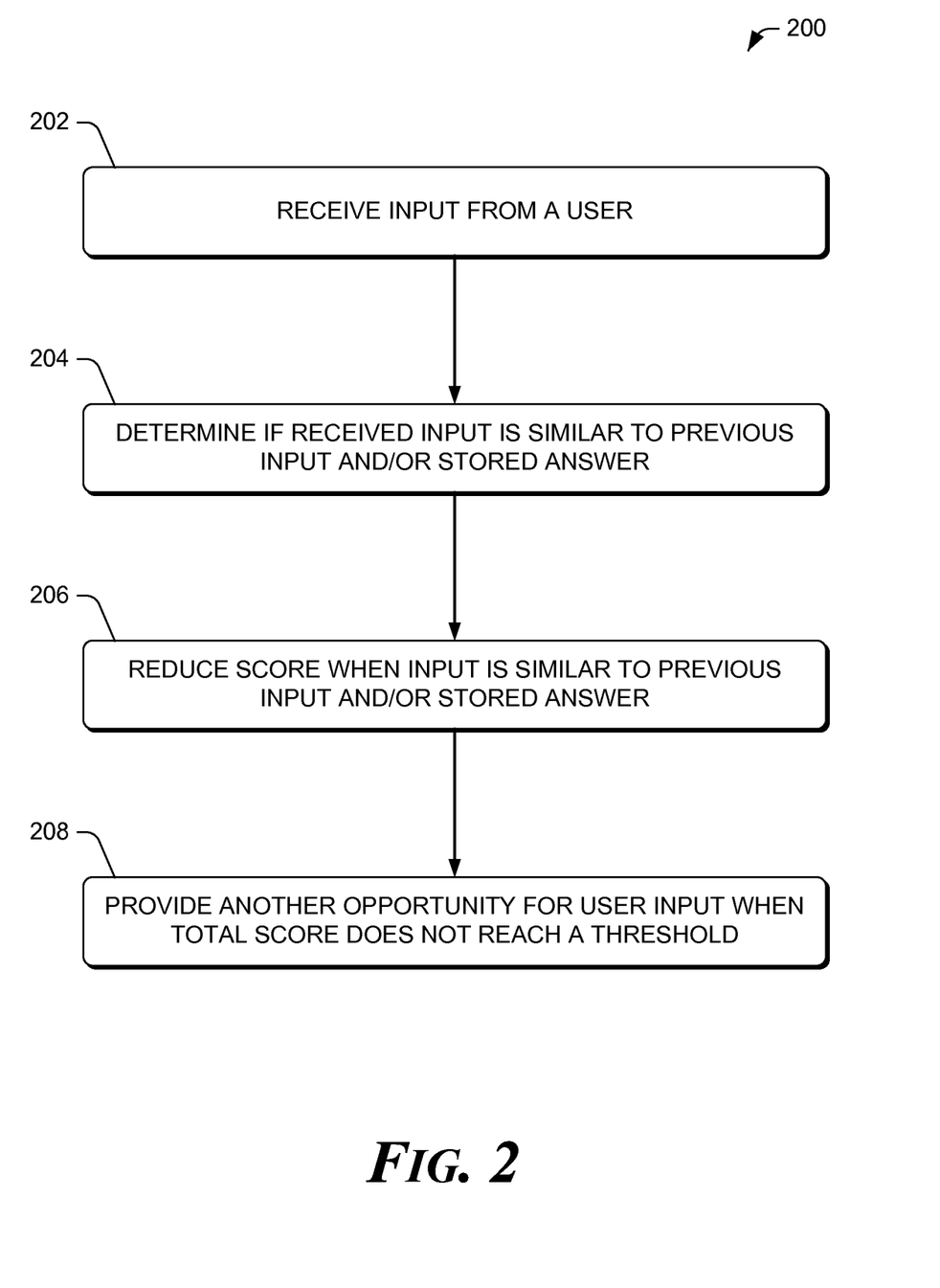
FIG. 2 is a flow diagram of an illustrative process of providing evidence-based dynamic scoring to limit guesses in knowledge based authentication.

FIG. 2 is a flow diagram of an illustrative process of providing evidence-based dynamic scoring to limit guesses in knowledge based authentication. The process 200 is illustrated as a collection of blocks in a logical flow graph, which represent a sequence of operations that can be implemented in hardware, software, or a combination thereof. In the context of software, the blocks represent computer-executable instructions that, when executed by one or more processors, cause the one or more processors to perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. Other processes described throughout this disclosure, in addition to process 200, shall be interpreted accordingly.

At 202 the authenticator 102 may receive an input from one of the users 104. The input (e.g., the input 112) may be submitted by the user 104 in response to a request for personal information from a knowledge based authentication process. For example, the received input may be an answer to a personal question (e.g., "What is your mother's maiden name?", "What is the name of your high school?", etc.) and/or a password, PIN, or other response to a knowledge based authentication question.

At 204, the authenticator 102 may determine if the received input is similar to a stored answer (correct answer) and/or a previous input received from the user 104. For example, the user 104 may accidently hit an extra key when typing the input. In such an instance, the input may be a lexicon of a previous input (or stored answer) with the exception of the extra input (e.g., typed "superdaad" instead of "superdad" as password, etc.). In another example, the received input may be semantically similar to a previous input (or stored answer). For example, a personal knowledge question may ask "Where were you born?" A received input of "Twin Cities" may be semantically similar to "Minneapolis" (previous input or stored answer).

At 206, the authenticator 102 may reduce a score associated with the input when the input is similar (e.g., lexicon, semantic, etc.) to a previous input and/or stored answer. Each input may have an associated score that is ultimately used to restrict the user 104 from indefinitely providing inputs to the authenticator 102. The score may be reduced by a multiplier or a function to lessen a negative impact of an incorrect input when the incorrect input is similar to the previous input and/or stored answer. For example, a score may be equal to 0.5, but reduced to 0.25 when the input is determined to be similar at the operation 206. In some embodiments, the score reduction may be based on an inverse function of the popularity of the score. Thus, a more popular input that is similar to another input may have a score reduced by a smaller amount that a score associated with an input that is less popular.

At 208, the authenticator 102 may provide another opportunity for the user 104 to submit an input to gain access to a resource when the score does not reach a threshold. For example, a threshold may be established that, when reached or exceeded, directs the authenticator 102 to enact additional security to protect unauthorized access to the restricted resource. The score may be summed (accumulated) after each incorrect input by the user. For example, the score may be 0.5 after a first input, 0.7 after a second input (+0.2) and 1.2 after a third input (+0.4). When the threshold is set to 1.0, the user 104 may not be provided with a fourth opportunity to provide the input to the personal knowledge based question and/or additional security measures may be implemented before allowing the user 104 to gain access to the restricted resource.

Figure 3:
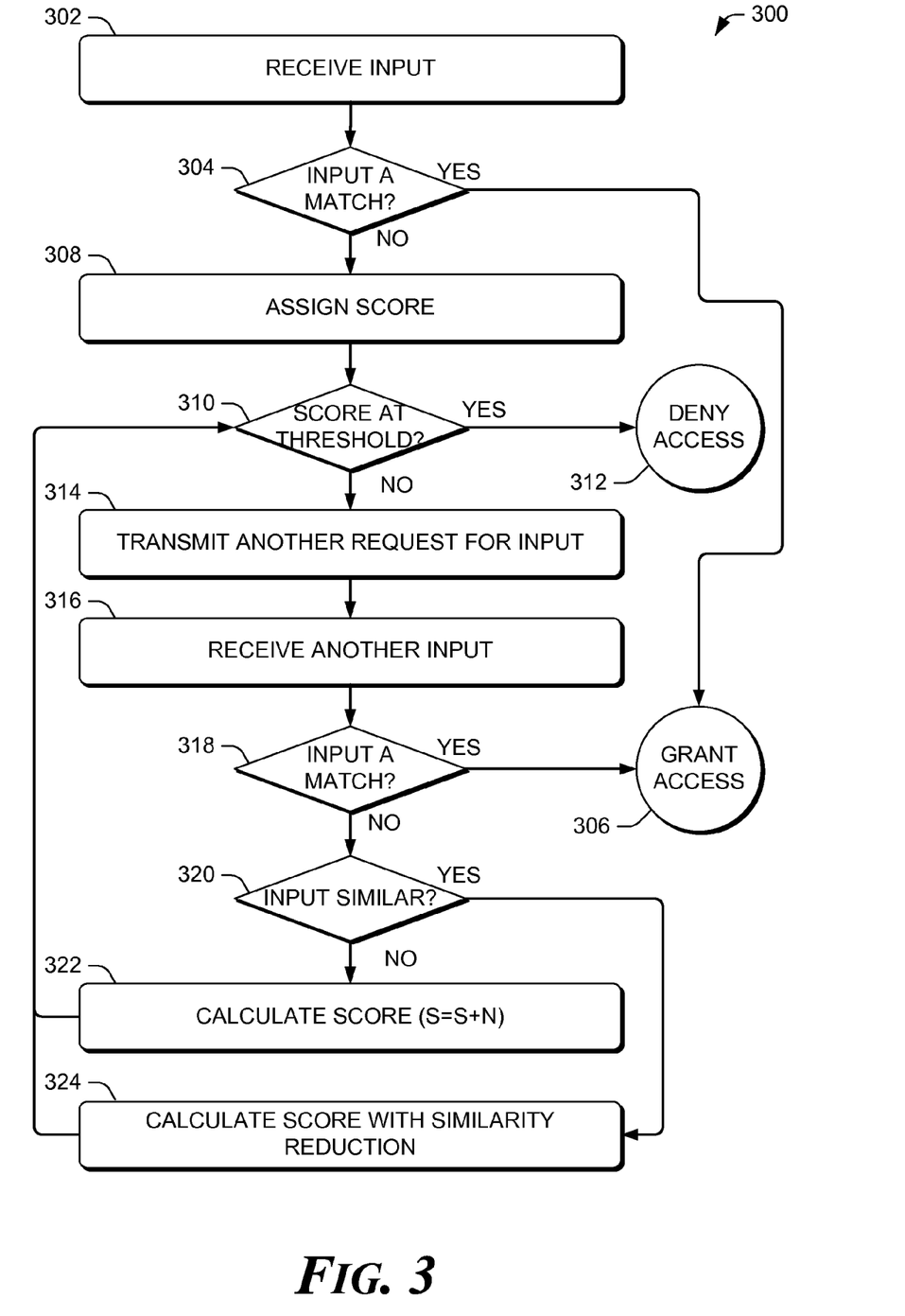
FIG. 3 is a flow diagram of another illustrative process of providing evidence-based dynamic scoring to limit guesses in for knowledge based authentication that includes a score reduction when a subsequent guess is similar to a previous input.
Figure 4:
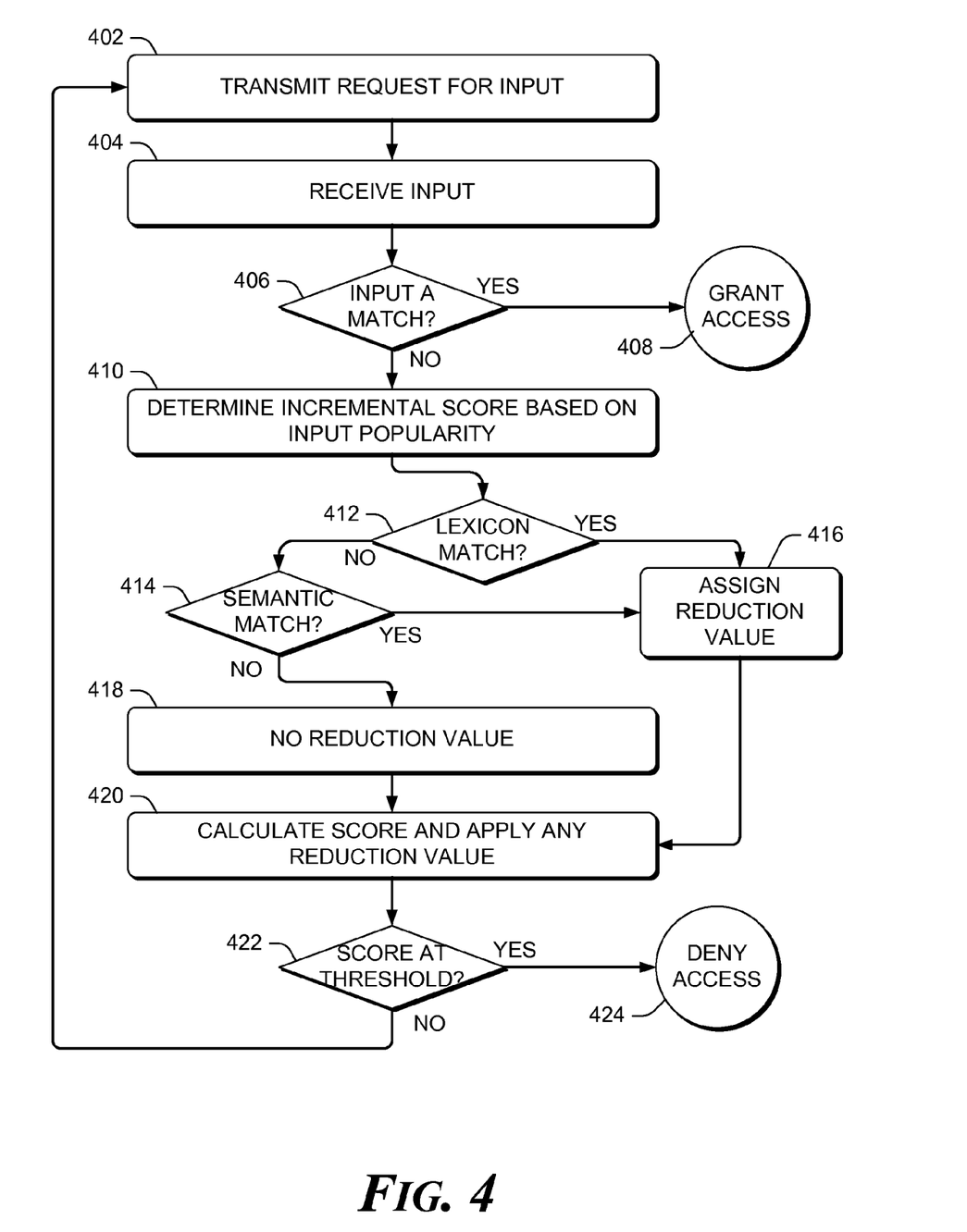
FIG. 4 is a flow diagram of yet another illustrative process of providing evidence-based dynamic scoring to limit guesses in knowledge based authentication that includes a score reduction when a subsequent input is similar to a previous input.

FIGS. 3 and 4 are flow diagrams of other illustrative processes of providing evidence-based dynamic scoring to limit guesses in knowledge based authentication. FIG. 3 shows an illustrative process 300 that includes a score reduction when a subsequent guess is similar to a previous input.

At 302, the authenticator 102 may receive an input (e.g., the input 112) from one of the users 104. For example, the user 104 may submit the input in response to a presentation of a personal authentication question, username/password request, or the like, which may ultimately enable the user 104 to obtain access to a restricted resource.

At 304, the authenticator 102 may determine whether the received input is a match with a stored (correct) answer (e.g., text, hash, etc.). The authenticator 102 may grant access to the restricted resource at 306 when the received input matches a stored answer. However, when the input is not a match with the stored answer, further processing may be warranted to enable the user 104 an additional opportunity to enter an input that matches the stored answer.

At 308, a score is assigned to the received input. The score may be a fixed score for each input or it may vary based on the input. For example, the score may always be assigned a valued of 0.25. In another example, the score may be based on the popularity of the input in comparison to other answers received by the authenticator 102, where an input that is popular may receive a higher score than an input that is unpopular.

At 310, the score may be compared to a threshold value. The threshold value may be a predetermined value that, when either reached or surpassed, triggers the authenticator 102 to deny access to the restricted resource at 312. In some embodiments, the threshold may be a fixed number (unchanging), however in various embodiments the threshold may be adjusted based on various factors that are described below.

At 314, the authenticator 102 may transmit another request for an input to the user 104 when the score does not reach (or exceed) the threshold at the operation 310. At 316, the authenticator 102 may receive the other input from the user 104. The received input from the operation 316 may then be compared to the stored answer at 318 (similar to the operation 304). The authenticator 102 may grant access to the restricted resource at 306 when the received input matches the stored answer.

At 320, the authenticator 102 may determine whether the input is similar to a previous input. For example, the received input at 316 may be a same incorrect answer as received at 302, a lexicon string of characters (extra letter, missing letter, etc.), a semantically similar word ("Twin Cities" instead of "Minneapolis"), or similar by another metric.

At 322, the score is calculated as an incremental score without a reduction when no input similarity is determined at the operation 320. For example, the score may be computed as the score from the operation 308 in addition to a score assigned from the incorrect input determined at 318 (plus any other previous scores due to the loop of the process 300) to generate a total score.

When the authenticator 102, via the dynamic scoring module 130, determines that the received input at 316 is similar to the input at 302 (or, in some embodiments, another previous input), then the authenticator 102 may calculate the score with a similarity reduction at 324. The similarity reduction may, in effect, act to increase a number of "tries" or times the user 104 can provide the input to gain access to the restricted resource, thus resulting in a "dynamic scoring." In some embodiments, the similarity reduction may be a based on a grouping (bucket) where input ranges have fixed reduction values, reduction values that correlate to a popularity of the input, or by other relationships between the inputs that can be used to reduce the score.

In accordance with various embodiments, the score computed at either the operation 322 or the operation 324 may be compared to the threshold at the operation 310. In this way, the user may have additional opportunities to enter the input to gain access to the restricted resource. The user may be more likely to receive additional opportunities to submit an input when the user previously enters inputs that are determined to be similar at the operation 320, thus resulting in a reduced incremental score at the operation 324.

FIG. 4 shows an illustrative process 400 of providing evidence-based dynamic scoring to limit guesses in knowledge based authentication that includes a score reduction when a subsequent input is a lexicon or semantically similar to a previous input.

At 402, the authenticator 102 may transmit a request for an input to one of the users 104. The input (e.g., a response to a personal authentication question, password, etc.) may enable the user to access a restricted resource when the input matches the stored answer. The authenticator 102 may receive the input at 404.

At 406, the authenticator 102 may determine whether the received input is a match with a stored (correct) answer (e.g., text, hash, etc.). The authenticator 102 may grant access to the restricted resource at 408 when the received input matches a stored answer. However, when the input is not a match with the stored answer, further processing may be warranted to enable the user 104 an additional opportunity to enter an input that matches the stored answer.

At 410, the authenticator 102 may determine an incremental score for the received input at 404 based on a popularity of the input. For example, an input that is relatively more popular may receive a higher score than an input that is relatively less popular. Popularity may be measured using historical data (previous inputs received by other users), by surveys, or by other sources.

In some embodiments, the score may be computed based on the percent of known answers received as the input (e.g., 30% of people provide this input, thus score is 0.3, etc.). In various embodiments, the incremental score for a range of scores may be assigned a single representative score (e.g., a grouped score, bucket score, etc.). For example, three groupings of scores may be used that correlate to the popularity of the input. Illustrative grouping values of 0.2, 0.35, and 0.5 may be used as group scores, such that each score may be assigned one of the grouping values (0.2, 0.35, 0.5). In an example, a score based on popularity of 0.11 may be assigned a grouping score of 0.2 while a score based on popularity of 0.38 may be assigned a grouping score of 0.35 (or in some instances 0.5 when values are rounded up). For purposes of discussion, the incremental score, whether a grouping score, pure popularity score, etc., will be referred to simply as the "score."

At 412, the authenticator 102 may determine whether the received input at 404 is a lexicon match to a stored value. In some embodiments, the stored value may be limited to previous inputs (via the operations 404 using a loop function). In various embodiments, the stored value may also include the stored answer, which is the correct answer necessary to grant access to the restricted resource at 408. A lexicon match may be determined using software algorithms that determine an edit distance. Further discussion of the lexicon match is provided in a discussion of FIG. 4a.

At 414, the authenticator 102 may determine whether the received input at 404 is a semantic match to the stored value. A semantic match may be determined using comparison algorithms that compare data using lookup tables. For example, a semantic match may occur when the user 104 enters an input that is a synonym of a previous input, among other possible semantic matches. Further discussion of the semantic match is provided in a discussion of FIG. 4b.

When either the lexicon match or the semantic match is positive (a match is made), then the authenticator 102 may assign a reduction value at 416. However, when both the lexicon match and the semantic match are false (no match), then the authenticator 102 may not assign a reduction value at 418. The reduction value may be a static number, vary based on the popularity of the received input at the operation 404, vary based on groupings (buckets) that each have a different reduction value, and so forth.

At 420, the authenticator 102, via the dynamic scoring module 130, may calculate the score and apply any reduction value from the operation 416. For example, a bucket score for an input may be assigned the score of 0.35. However, the received input at 404 (e.g., "superddad") may be a lexicon match of a previous input (e.g., "superdad"). In this instance, a reduction value may be assigned, such as 25% or another value used to reduce the incremental score, such that the score 0.35 may be reduced to 0.0875 (0.35×0.25=0.0875).

In some embodiments, the score that is reduced by the reduction value may be the lesser of two or more received scores, and not necessarily the determined incremental score from operation 410. For example, a first input may be assigned a score of 0.2 while a second input may be assigned a score of 0.5. When the second input is determined to be semantically similar (or a lexicon match) to the first input, a reduction value may be assigned at 414, which may then be applied to the lesser of the two scores (i.e. 0.2). In this way, it may not be advantageous for a user to provide a more popular input after providing a less popular input in order to receive additional opportunities at entering the input.

At 422, the score may be compared to a threshold value. The threshold value may be a predetermined value that, when either reached or surpassed, triggers the authenticator 102 to deny access to the restricted resource at 424. When the threshold is not either reached or exceeded (depending on the implementation), then the process 400 may continue at 402 where the authenticator 102 requests another input from the user 104.

Figure 4A:
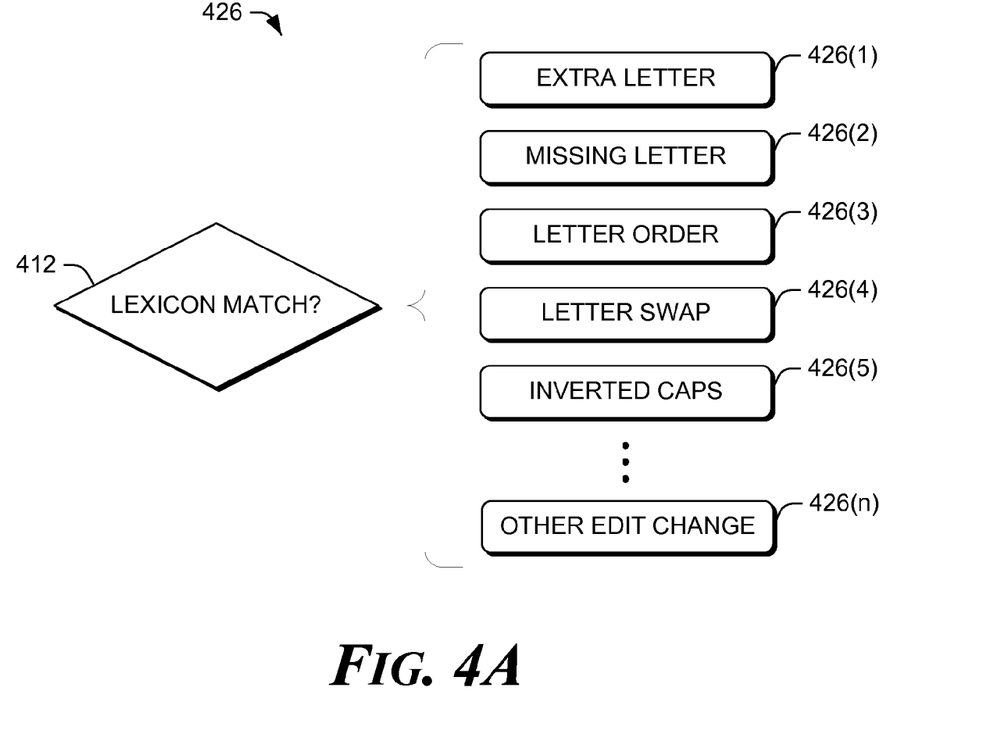
FIG. 4A is a block diagram of an illustrative data structure that may be used to determine a lexicon match.

FIG. 4A is a block diagram of an illustrative data structure 426 that may be used to determine a lexicon match. As discussed above with reference to the operation 412, the lexicon match may be performed by evaluating various lexicon features of an input in comparison to another input and/or the stored answer.

In some embodiments, a computer algorithm may compute an edit distance to determine whether a lexicon match exists based on evaluators 426(1)-426(n). A non-exhaustive list of the evaluators may include an extra letter 426(1), a missing letter 426(2), a letter order 426(3), a letter swap 426(4), an inverted capitalization 426(5), and other possible edit changes 426(n). The evaluators may be used individually or in any combination to create a total edit distance. When the total edit distance is within a lexicon threshold, then the authenticator 102 may determine that a lexicon match exists at the operation 412. In an example, a first input of "Brooklyn" in comparison to a second input of "Brooklyn, N.Y." may have an edit distance of three when using the evaluator of the extra letter 426(1), which may be determined to be a lexicon match at the operation 412.

In some embodiments, the computed edit distance may be influence the size of the reduction in the incremental score received at 416. For example, a lower edit distance may result in a greater reduction in the incremental score at 416 because the input is closer to a previous input than when the edit distance is a larger value.

Figure 4B:
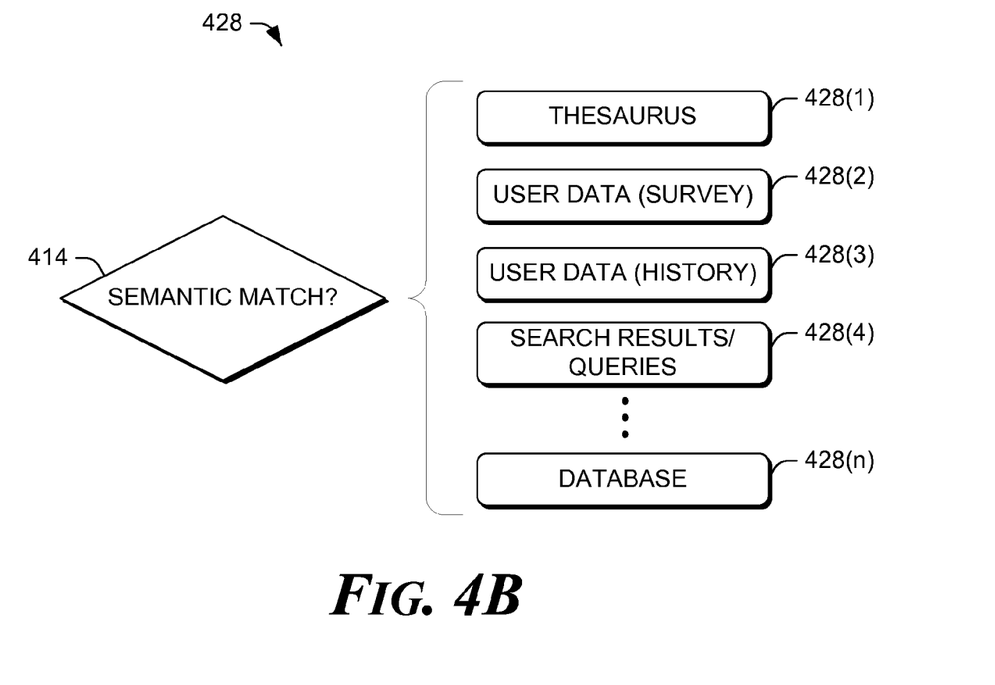
FIG. 4B is a block diagram of an illustrative data structure that may be used to determine a semantic match.

FIG. 4B is a block diagram of an illustrative data structure 428 that may be used to determine a semantic match. As discussed above with reference to the operation 414, the semantic match may be performed by evaluating semantic similarities between an input and another input and/or the stored answer.

In some embodiments, an input may be determined to be semantically similar to another input and/or the correct answer based on a term comparison (e.g., comparison of an input to another input, etc.). The term comparison may be made using one or more of the evaluators 428(1)-428(n). A non-exhaustive list of the evaluators may include a thesaurus 428(1), user survey data 428(2), user history data 428(3), search results/queries 428(4), and other databases 428(n).

In an example, the term comparison using the thesaurus 428(1) may associate a first input as a synonym of a second input, and thus designate the input as a semantic match at the operation 414. In a second example, an input of a location (e.g., "New York") may be determined to be semantically similar to an input of another location that may be synonymous with the first inputted location (e.g., "Manhattan") via a database 428(n) of locations, which may result in a semantic match at the operation 414. In a third example, the search results/queries 428(4) may be used to determine relationships between inputs based on terms two terms that are have a correlation based on search results and/or search queries. For example, search results for an input that result in a predetermined percentage of results (hits) having the second term may result in a semantic match at the operation 414. In a final example, the first input of "Brooklyn" in comparison to the second input of "Brooklyn, N.Y." may be determined to be a semantic match at the operation 414 because they identify the same location, which could again be verified by the database 428(n). In such an instance, both a semantic match and lexicon match are possible.

Illustrative Authentication Strength Assessment

Figure 5:
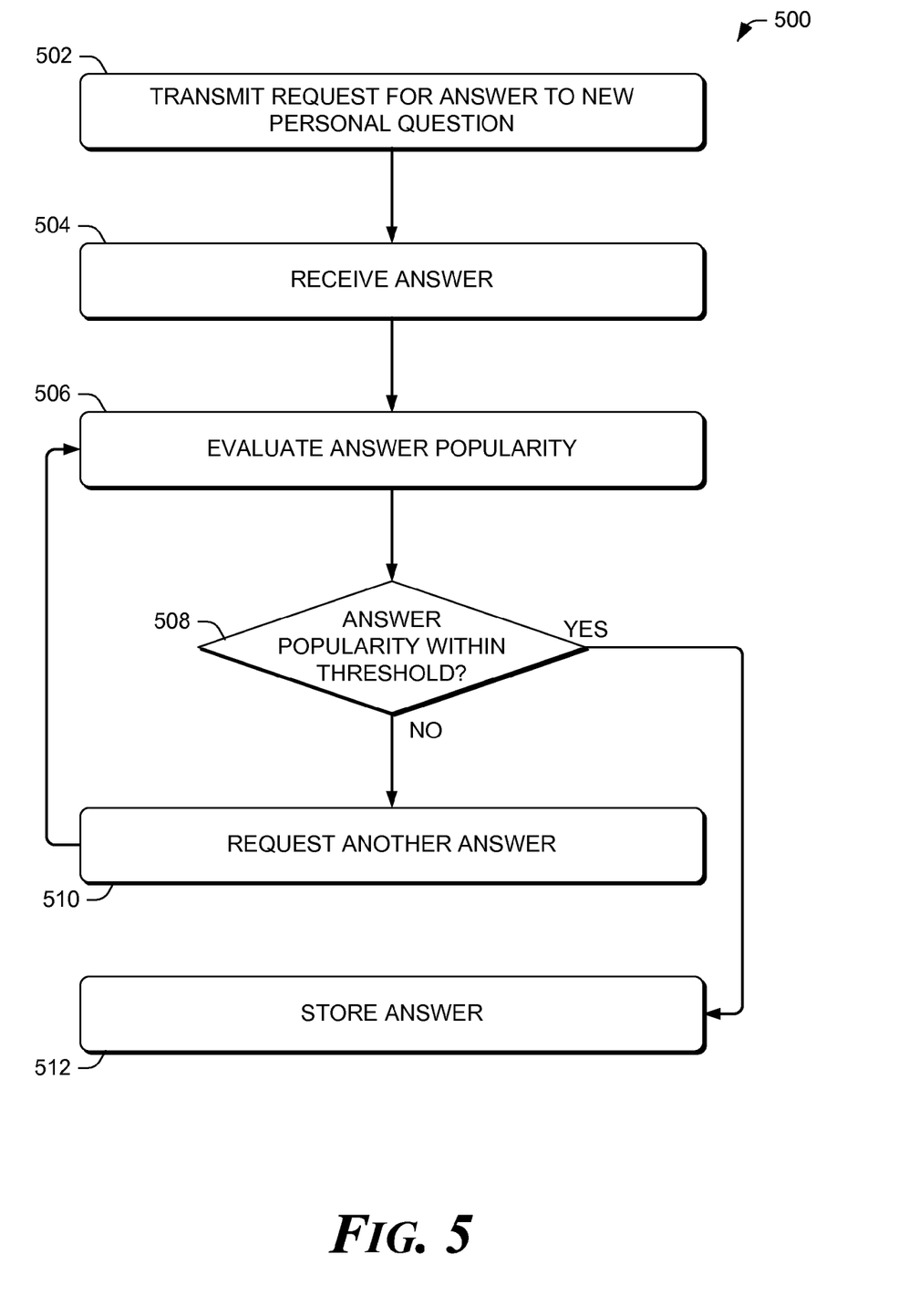
FIG. 5 is a flow diagram of an illustrative process of providing answer evaluation for knowledge based authentication questions.
Figure 6:
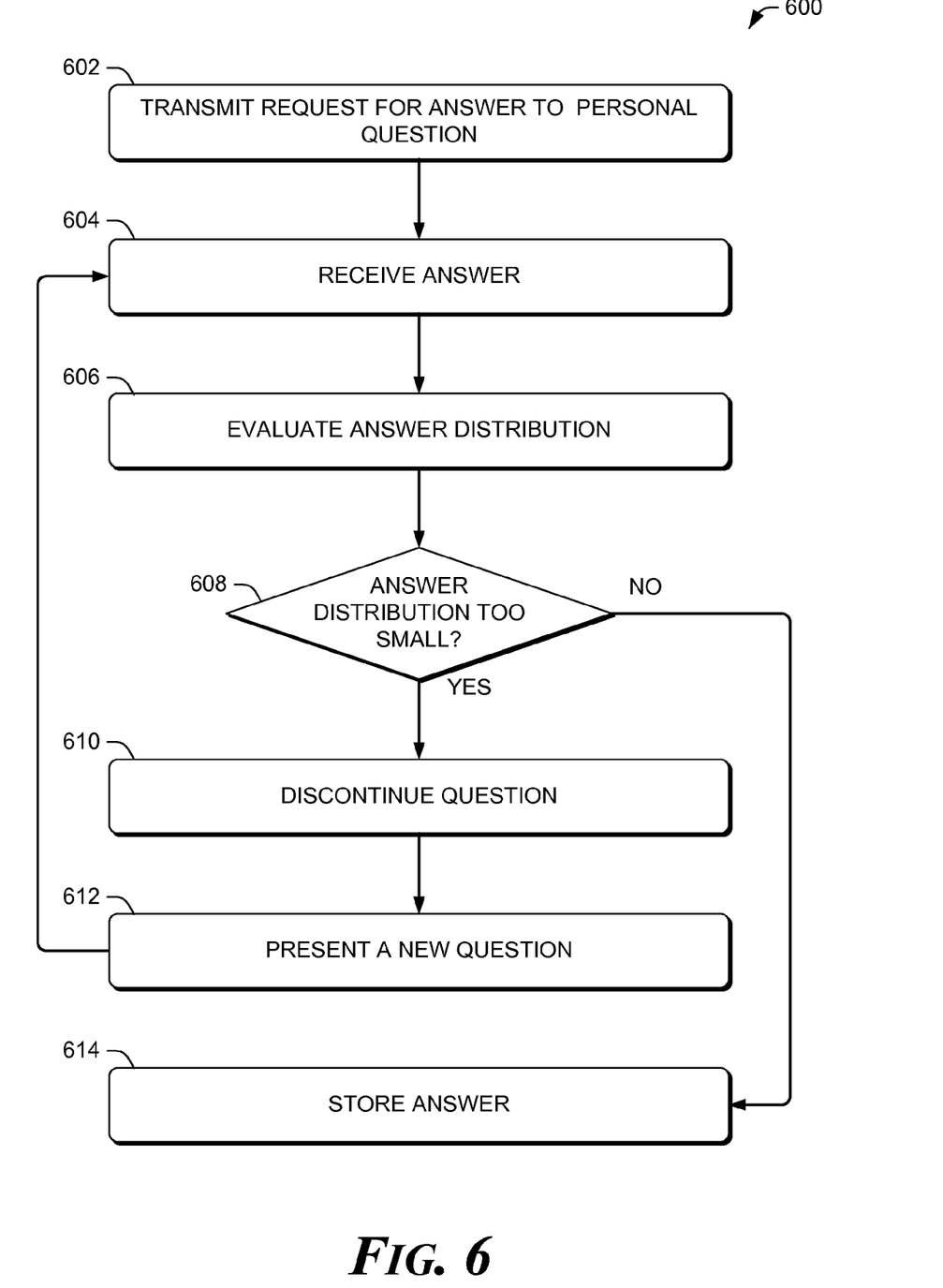
FIG. 6 is a flow diagram of an illustrative process of providing question evaluation for knowledge based authentication using an answer distribution.
Figure 7:
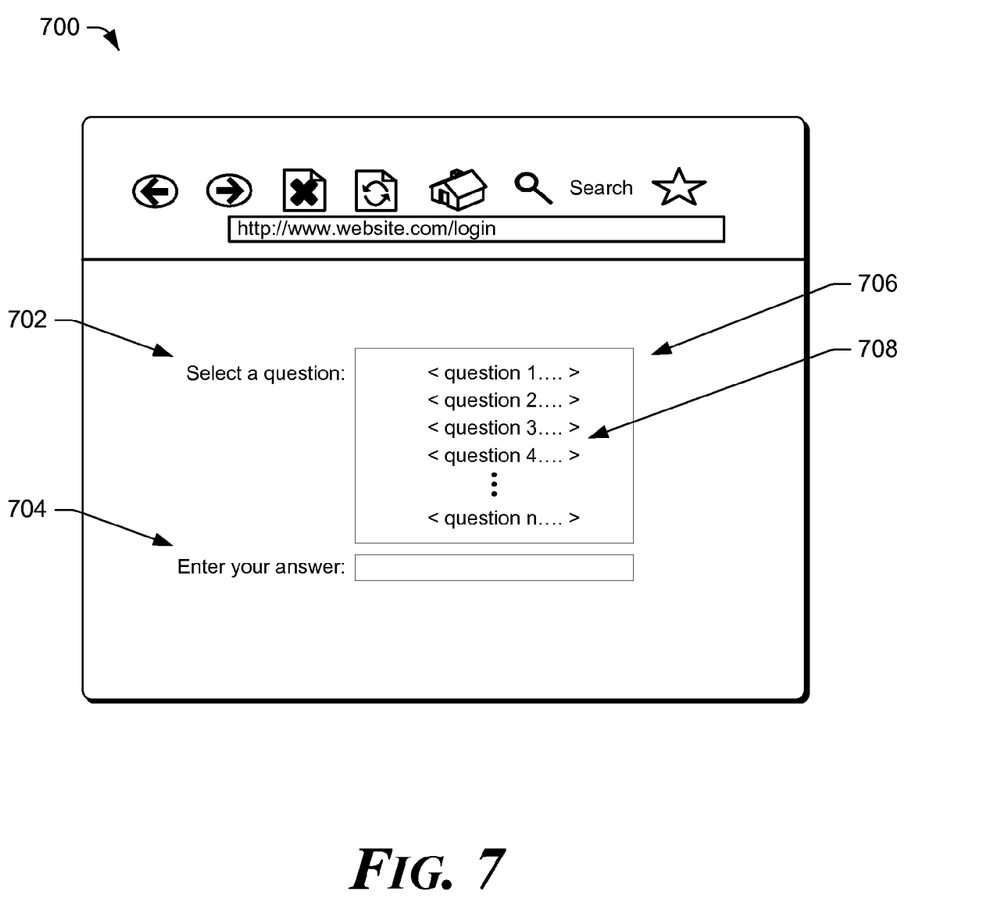
FIG. 7 is an illustrative personal knowledge based authentication interface that may enable dynamically updating a list of questions based on an answer distribution.

As discussed in the overview and with reference to FIG. 1 and the environment 100, the authenticator 102 may include an authentication value strength module 132 (or simply "strength module"). An authentication value may be an authentication question and/or an input in response to the authentication question, which may be analyzed to determine a strength (i.e., uniqueness). FIGS. 5-6 provide processes to determine the strength of the authentication value using the authentication value strength module 132. FIG. 7 provides an illustrative login that may be implemented in conjunction with the processes described in FIGS. 5-7.

FIG. 5 is a flow diagram of an illustrative process 500 of providing answer evaluation for knowledge based authentication questions. The order in which the operations are described is not intended to be construed as a limitation, and any number of the described blocks can be combined in any order and/or in parallel to implement the process 500, or other processes implemented by the strength module 132.

At 502, the authenticator 102 may transmit a request for an answer to a new personal question, which may be used to enable the user 104 to gain access to a restricted resource, such as using one of the processes 200, 300, or 400 discussed above. At 504, the authenticator may receive an answer from the user 104 in response to the operation 502.

At 506, the authenticator 102 may determine the popularity of the answer in comparison to other users' answers (e.g., survey answers, actual answer stored in a database, etc.). At 508, the authenticator 102 may determine whether the received answer at 504 is within a threshold that determines that the answer is relatively difficult to guess (i.e., strong answer). In some embodiments, the threshold may be set at a percentage of the answers. For example, when the threshold is 10% and 11% of users have selected the received answer at the operation 504, the threshold would be surpassed and the authenticator 102 would request another answer at 510. For example, the authenticator 102 may request the user 104 to input a more specific answer (e.g., "Bronx" instead of "New York", etc.). However, if the answer is within the threshold at 508, then the authenticator 102 may store the answer as a correct answer (input) at 512.

FIG. 6 is a flow diagram of an illustrative process 600 of providing question evaluation for knowledge based authentication using an answer distribution. Again, the order in which the operations are described is not intended to be construed as a limitation, and any number of the described blocks can be combined in any order and/or in parallel to implement the process 600, or other processes implemented by the strength module 132.

At 602, the authenticator 102 may transmit a question to one of the users 104 and receive an answer (i.e. the input 112) at 604. The authenticator 102 may then evaluation the answer distribution to determine whether the answer distribution is large enough to continue use of the question at operation 606, which may be determined using a limit at 608.

When the answer distribution is too small (e.g., below a limit) at 608, the question may be discontinued at 610. At 612, a new question may be presented to the user. However, when the answer distribution is not too small (e.g., outside of a limit), then the authenticator 102 may store the answer as the correct answer (input) at 614.

In some embodiments, the data provider 116 may submit questions and/or answers to the authenticator 102 via the data server(s) 118 for evaluation using the processes 500 and/or 600. In this way, the data providers 116 may be able to offer restricted access to resources that is unlikely to be compromised by unauthorized users that exploit popular answers.

FIG. 7 is an illustrative personal knowledge based authentication interface 700 that may enable dynamically updating a list of questions based on an answer distribution using the process 600. The interface 700 may include a question selection portion 702 and an answer (input) form 704. The question selection portion 702 may be populated with available questions 706, which may be selected by one of the users 104 and then answered in the answer form 704. In accordance with various embodiments, the list of available questions 706 may be modified by implementing the process 600. A question 708 may be discontinued from use after the operation 610. Thus, the interface 700 may include a dynamically populated list of questions that may be selected by a user 104 and have a distribution of answers that is above a limit as determined by the strength module 132 at the operation 608.

Illustrative Computing System

Figure 8:
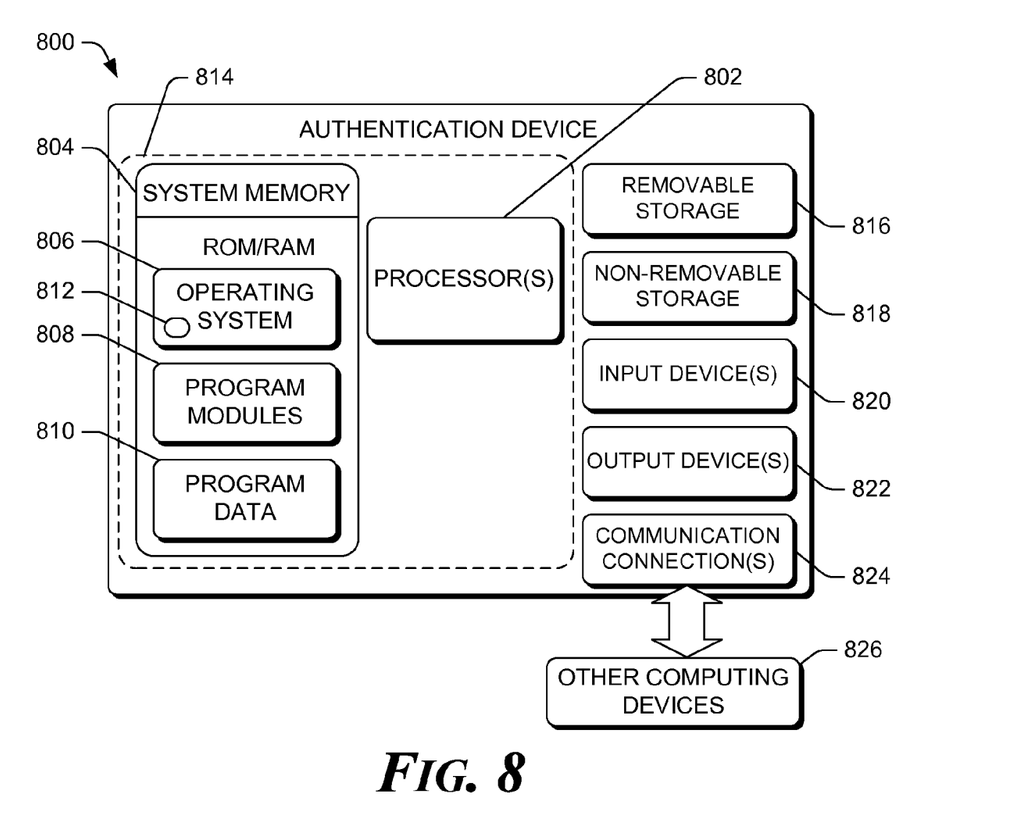
FIG. 8 is a block diagram of an illustrative authentication device that may be used to implement knowledge based access to resources as shown in the environment of FIG. 1.

FIG. 8 is a block diagram of an illustrative authentication device 800 that may be used to implement knowledge based access to resources as shown in the environment of FIG. 1. It will readily be appreciated that the various embodiments of synonym identification techniques and mechanisms may be implemented in other computing devices, systems, and environments. The authentication device 800 shown in FIG. 8 is only one example of a computing device and is not intended to suggest any limitation as to the scope of use or functionality of the computer and network architectures. The authentication device 800 is not intended to be interpreted as having any dependency or requirement relating to any one or combination of components illustrated in the example computing device.

In a very basic configuration, the authentication device 800 typically includes at least one processing unit 802 and system memory 804. Depending on the exact configuration and type of authentication device, the system memory 804 may be volatile (such as RAM), non-volatile (such as ROM, flash memory, etc.) or some combination of the two. The system memory 804 typically includes an operating system 806, one or more program modules 808, and may include program data 810. The operating system 906 includes a component-based framework 912 that supports components (including properties and events), objects, inheritance, polymorphism, reflection, and provides an object-oriented component-based application programming interface (API). The authentication device 800 is of a very basic configuration demarcated by a dashed line 814. Again, a terminal may have fewer components but will interact with a computing device that may have such a basic configuration.

The authentication device 800 may have additional features or functionality. For example, the authentication device 800 may also include additional data storage devices (removable and/or non-removable). Such additional storage is illustrated in FIG. 8 by removable storage 816 and non-removable storage 818. Computer storage media may include volatile and nonvolatile, removable and non-removable media implemented in any method or technology for storage of information, such as computer readable instructions, data structures, program modules, or other data. The system memory 804, the removable storage 816, and the non-removable storage 818 are all examples of computer storage media. The authentication device 800 may also have input device(s) 820 (e.g., keyboard, etc.) and output device(s) 822 (e.g., display, etc.).

The authentication device 800 may also contain communication connections 824 that allow the device to communicate with other computing devices 826 (e.g., the data server(s) 118, etc.), such as over the network 108. The network(s) 108 may include wired networks as well as wireless networks. The communication connections 824 are one example of communication media. The communication media may typically be embodied by computer readable instructions, data structures, program modules, etc.

It is appreciated that the illustrated authentication device 800 is only one example of a suitable device and is not intended to suggest any limitation as to the scope of use or functionality of the various embodiments described. Other well-known computing devices, systems, environments and/or configurations that may be suitable for use with the embodiments include, but are not limited to personal computers, server computers, hand-held or laptop devices, multiprocessor systems, microprocessor-based systems, set top boxes, game consoles, programmable consumer electronics, network PCs, minicomputers, mainframe computers, distributed computing environments that include any of the above systems or devices, and/or the like. For example, some or all of the components of the authentication device 800 may be implemented in a cloud computing environment, such that resources and/or services are made available via a computer network for selective use by client devices.

Figure 9:
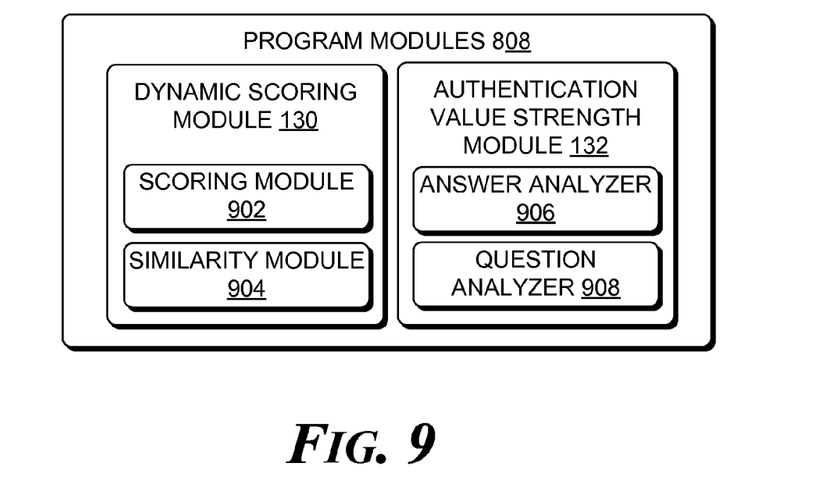
FIG. 9 is a block diagram of illustrative program modules shown in FIG. 8.

FIG. 9 is a block diagram of illustrative program modules 808 shown in FIG. 8 and described above with the authentication device 800. In accordance with various embodiments, the dynamic scoring module 130 may include a scoring module 902 to determine a score of an input (e.g., the input 112) for one of the processes 200, 300, and 400. The scoring module 902 may base the score for an input on the popularity of the score, by grouping the scores into two or more groupings (buckets), or by other scoring techniques to generate and track an accumulating score that is compared against a threshold value.

The dynamic scoring module 130 may also include a similarity module 904 to determine whether an input is similar to a previous input, and in some embodiments, to the stored answer. The similarity module 904 may perform the lexicon match 412 using one or more of the evaluators 426(1)-($n$) and/or the semantic match 414 using one or more of the evaluators 428(1)-428($n$). The dynamic scoring module 130 may then reduce an incremental score, which is ultimately compared to a threshold, which may enable the user 104 to enter another input to gain access to the restricted resource. The reduction may be based at least in part on an edit distance value.

The authentication value strength module 132 (or simply "strength module") may include an answer analyzer 906 and a question analyzer 908. The answer analyzer 906 may evaluate the answer distribution of answers as described in the process 600. The answer analyzer 906 may use one or more data sources, such as user history, survey data, etc., to determine whether an answer is too popular, and thus does not provide an acceptable selection as an answer to a knowledge based personal authentication questions used to allow a user to obtain access to a restricted resource.

In various embodiments, the question analyzer 908 may evaluate the answer distribution of answers to questions as described in the process 700. The question analyzer 906 may use one or more data sources, such as user history, survey data, etc., to determine whether a question leads to answers with a low answer distribution (e.g., popular answers), and thus does not generate answers that provide secure access to the requested resource.

CONCLUSION

Although the techniques have been described in language specific to structural features and/or methodological acts, it is to be understood that the appended claims are not necessarily limited to the specific features or acts described. Rather, the specific features and acts are disclosed as exemplary forms of implementing such techniques.

What is claimed is:
1. A system comprising:
 memory
 one or more processors;
 one or more modules stored in the memory and executable by the one or more processors to perform operations comprising:
  receiving an input from a user in response to a personal question, the input being different than a stored answer of the personal question;
  determining, by a computing device including one or more processors, whether the input is a lexicon or semantically similar to a previous input by the user;

assigning a score to the input based on a comparison between the input and previously stored inputs from other users in response to questions related to the personal question;

reducing the score if the input is determined to be the lexicon or semantically similar to the previous input;

summing the score with previous scores of the session to create a total score for the session; and transmitting another request for a correct input in response to a determination that the total score for the session satisfies a threshold, wherein a number of times that the user is allowed to attempt a correct input to the personal question is dynamically adjusted based at least in part on the total score for the session.

2. The system as recited in claim 1, wherein the determining whether the input is the lexicon includes:

calculating an edit distance between the input and the previous input;

comparing the edit distance to an edit distance threshold; and designating the input as the lexicon if the edit distance satisfies the edit distance threshold.

3. The system as recited in claim 1, wherein determining whether the input is semantically similar includes:

searching a semantic database using the input to generate a search output;

determining whether the previous input is included in the search output; and designating the input as semantically similar to the previous input if the previous input is included in the search output.

4. The system as recited in claim 1, wherein the determining whether the input is the lexicon or semantically similar to the previous input also includes determining whether the input is the lexicon or semantically similar to the stored answer, and reducing the score if the input is determined to be the lexicon or semantically similar to the stored answer.

5. The system as recited in claim 1, wherein the score is assigned to the session in part based on a popularity of the input.

6. The system as recited in claim 1, wherein the input is a user login password.

7. One or more storage devices storing computer-executable instructions that, when executed on one or more processors, causes the one or more processors to perform acts comprising:

receiving an input from a user during a session in response to an authentication question;

comparing the input to a stored answer of the authentication question;

assigning, based on the comparing, a score to the input;

determining whether the input is at least one of a lexicon match or a semantic match with a previous input by the user;

reducing the score if the input is determined to be at least one of the lexicon match or the semantic match;

after reducing the score, summing the score with one or more previous scores to create a total score for the session; and transmitting an additional request for an additional input to a user device in response to a determination that the total score for the session satisfies a threshold value, wherein a number of times that the user is allowed to attempt a correct input to the authentication question is dynamically adjusted based at least in part on the total score for the session.

8. The one or more storage devices as recited in claim 7, wherein the assigning the score to the input comprises assigning the score based on a popularity of the input as compared to a distribution of inputs received from other users in response to questions associated with the authentication question.

9. The one or more storage devices as recited in claim 7, wherein the score includes a previous input score associated with the previous input and a received input score associated with the input, and wherein the reducing the score includes reducing the score of a lower of the previous input score and the received input score.

10. The one or more storage devices as recited in claim 7, wherein the determining whether the input is the lexicon match includes:

calculating an edit distance;

comparing the edit distance to a threshold; and designating the input as the lexicon match if the edit distance satisfies the threshold.

11. The one or more storage devices as recited in claim 10, wherein the reducing the score is based on the edit distance.

12. The one or more storage devices as recited in claim 7, wherein the determining whether the input is the semantic match includes:

searching a semantic database using the input to generate a search output;

determining whether the previous input is included in the search output; and designating the received input as the semantic match to the previous input if the previous input is included in the search output.

13. The one or more storage devices as recited in claim 12, wherein the semantic database includes at least one of a thesaurus, a geographical database, or a user input database.

14. The one or more storage devices as recited in claim 7, wherein the previous input is restricted to a previous login attempt.

15. A method comprising:

receiving, by one or more servers, a new answer to a personal question;

analyzing, using the one or more servers, received answers to the personal question to create an answer distribution of received answers;

dynamically updating, using the one or more servers, a question list by removing the personal question from the question list in response to determining that the answer distribution of the received answers is less than a predetermined value.

16. The method as recited in claim 15, further comprising:

comparing, using the one or more servers, the new answer to the answer distribution of received answers;

designating, using the one or more servers, the new answer as a popular answer in response to determining that an occurrence of the new answer in the answer distribution satisfies a popularity threshold;

rejecting, using the one or more servers, the new answer; and transmitting, using the one or more servers, a request for another new answer.

17. The method as recited in claim 16, wherein the request for the another new answer includes a request for a more specific answer than the new answer.

18. The method as recited in claim 15, wherein the answer distribution of received answers includes answers used to establish the new answer to the personal question.

19. The method as recited in claim 15, further comprising discontinuing use of the personal question if the new answer is designated as a popular answer.

20. The method as recited in claim 19, wherein discontinuing use of the personal question includes removing the personal question from a list of selectable personal questions.

\* \* \* \* \*